(12) United States Patent
Ralph et al.

(10) Patent No.: US 12,612,164 B2
(45) Date of Patent: Apr. 28, 2026

(54) INTERLOCK ASSEMBLY FOR SECURING A PASSENGER SEAT TRAY TABLE

(71) Applicant: B/E Aerospace, Inc., Winston-Salem, NC (US)

(72) Inventors: Neil M. Ralph, Winston-Salem, NC (US); Ryan J. Suhre, Winston-Salem, NC (US); Bradley E. Burgess, Pfafftown, NC (US); Robert D. Wilkey, Atlanta, GA (US); Thomas W. Cahoon, Chamblee, GA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 168 days.

(21) Appl. No.: 18/671,488

(22) Filed: May 22, 2024

(65) Prior Publication Data

US 2025/0361015 A1 Nov. 27, 2025

(51) Int. Cl.
| | |
|---|---|
| *B60N 3/00* | (2006.01) |
| *B64D 11/06* | (2006.01) |
| *A47C 7/68* | (2006.01) |
| *A47C 7/70* | (2006.01) |

(52) U.S. Cl.
CPC ............ *B64D 11/0638* (2014.12); *A47C 7/68* (2013.01); *A47C 7/70* (2013.01); *B60N 3/002* (2013.01); *B60N 3/004* (2013.01)

(58) Field of Classification Search
CPC ........ B60N 3/004; B60N 3/002; B60N 3/003; B60N 3/006; B60N 3/007; B64D 11/0638; A47C 7/68; A47C 7/70
See application file for complete search history.

(56) References Cited

U.S. PATENT DOCUMENTS

| | | | |
|---|---|---|---|
| 8,702,163 B2 | 4/2014 | Westerink et al. | |
| 9,179,769 B1 * | 11/2015 | Port ...................... | A47C 7/705 |
| 9,663,978 B2 | 5/2017 | Saravia Terricabras et al. | |
| 10,384,581 B2 | 8/2019 | Preisler et al. | |
| 10,556,688 B2 | 2/2020 | Bhat et al. | |
| 10,696,407 B2 | 6/2020 | Murray et al. | |
| 2014/0159441 A1 | 6/2014 | Philipzik et al. | |

* cited by examiner

*Primary Examiner* — Syed A Islam
(74) *Attorney, Agent, or Firm* — Suiter Swantz IP

(57) ABSTRACT

An interlock assembly for securing a passenger seat tray table including a mounting block mountable to a passenger seat, a catch pivotally mounted to the mounting block and configured to pivot about a first pivot axis, a handle pivotally mounted to the mounting block and configured to pivot about a second pivot axis, a first torsion spring biasing the catch open, and a second torsion spring biasing the handle closed. In use, the handle and the catch are configured to close and interlock to secure the passenger seat tray table, and disengage and open to release the passenger seat tray table. The interlock assembly may be a line replaceable unit, a component of a tray table assembly, a component of a passenger seat assembly, etc.

20 Claims, 5 Drawing Sheets

118    116    106

INTERLOCK ASSEMBLY FOR SECURING A PASSENGER SEAT TRAY TABLE

TECHNICAL FIELD AND BACKGROUND

The present disclosure relates generally to passenger seat tray tables, and more particularly, to a spring-loaded interlock assembly for securing a tray table.

Tray tables for passenger seats are well known. In aircraft, and particularly in economy seating classes, tray tables stow against the back of a passenger seat and deploy to a horizontal use position during flight. Passenger seats are further equipped with latches for securing the tray table during normal operation as well as during a crash event.

Traditional latches include rotating toggles. In use, the toggle is rotated vertically to retain the tray table, and rotated horizontally to release the tray table. Rotating toggles are not only disadvantageous for requiring two-handed operation (i.e., one to handle the tray table and the other to rotate the toggle), but also present a head strike danger, have protruding surfaces to catch on during ingress and egress, and are unsightly for the backrest aesthetics.

Therefore, what is needed is a latch solution for securing a tray table that overcomes the disadvantages of traditional latches.

BRIEF SUMMARY

According to one aspect, the inventive concepts according to the present disclosure are directed to an assembly for securing a passenger seat tray table. In embodiments, the assembly includes a mounting block mountable to a passenger seat, a catch pivotally mounted to the mounting block and configured to pivot about a first pivot axis, a handle pivotally mounted to the mounting block and configured to pivot about a second pivot axis, a first torsion spring biasing the catch open, and a second torsion spring biasing the handle closed. In use, the handle and the catch are configured to close and interlock to secure the passenger seat tray table, and disengage and open to release the passenger seat tray table.

In some embodiments, the handle has an exterior facing side and an interior facing side, the catch has an exterior facing side, an interior facing side, and an interior space positioned between the exterior facing side and the interior facing side, the passenger seat tray table is configured to be caught in the interior space to secure the passenger seat tray table, and the exterior facing side of the catch is configured to interlock with the interior facing side of the handle.

In some embodiments, a shape of the interior facing side of the handle substantially matches a shape of the exterior facing side of the catch such that the two facing sides interlock in tight-fitting engagement.

In some embodiments, the interior facing side of the handle includes a groove, the exterior facing side of the catch includes a notch, and the notch is configured to be received in the groove to interlock the handle and the catch.

In some embodiments, when the handle and the catch are disengaged, the catch is open to receive the passenger seat tray table.

In some embodiments, the action of securing the tray table causes the catch to close and the handle to close automatically to interlock with the catch, and the action of opening the handle causes the handle to disengage from the catch to allow the catch to open to release the passenger seat tray table.

In some embodiments, the second pivot axis is positioned above the first pivot axis.

According to another aspect, the inventive concepts according to the present disclosure are directed to a tray table assembly for a passenger seat. In embodiments, the tray table assembly includes a tray table mountable to the passenger seat and an interlock subassembly including a mounting block mountable to the passenger seat, a catch pivotally mounted to the mounting block and configured to pivot about a first pivot axis, a handle pivotally mounted to the mounting block and configured to pivot about a second pivot axis, a first torsion spring biasing the catch open, and a second torsion spring biasing the handle closed. In use, the handle and the catch are configured to close and interlock to secure the tray table in a stowed position, and disengage and open to release the tray table for deployment.

In some embodiments, the interlock subassembly is configured to be mounted to the passenger seat above the tray table such that the handle is positioned above the tray table when the tray table is in the stowed position.

According to a further aspect, the inventive concepts according to the present disclosure are directed to an aircraft passenger seat assembly including a passenger seat having a backrest, a tray table moveable between a stowed position against a back of the backrest and a deployed position apart from the backrest, and an interlock subassembly for securing the tray table in the stowed position.

In some embodiments, the assembly further includes a bezel mounted to the back of the backrest, the bezel including a bottom recess for receiving the handle when the handle is open.

BRIEF DESCRIPTION OF THE DRAWINGS

Implementations of the inventive concepts disclosed herein may be better understood when consideration is given to the following detailed description thereof. Such description refers to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
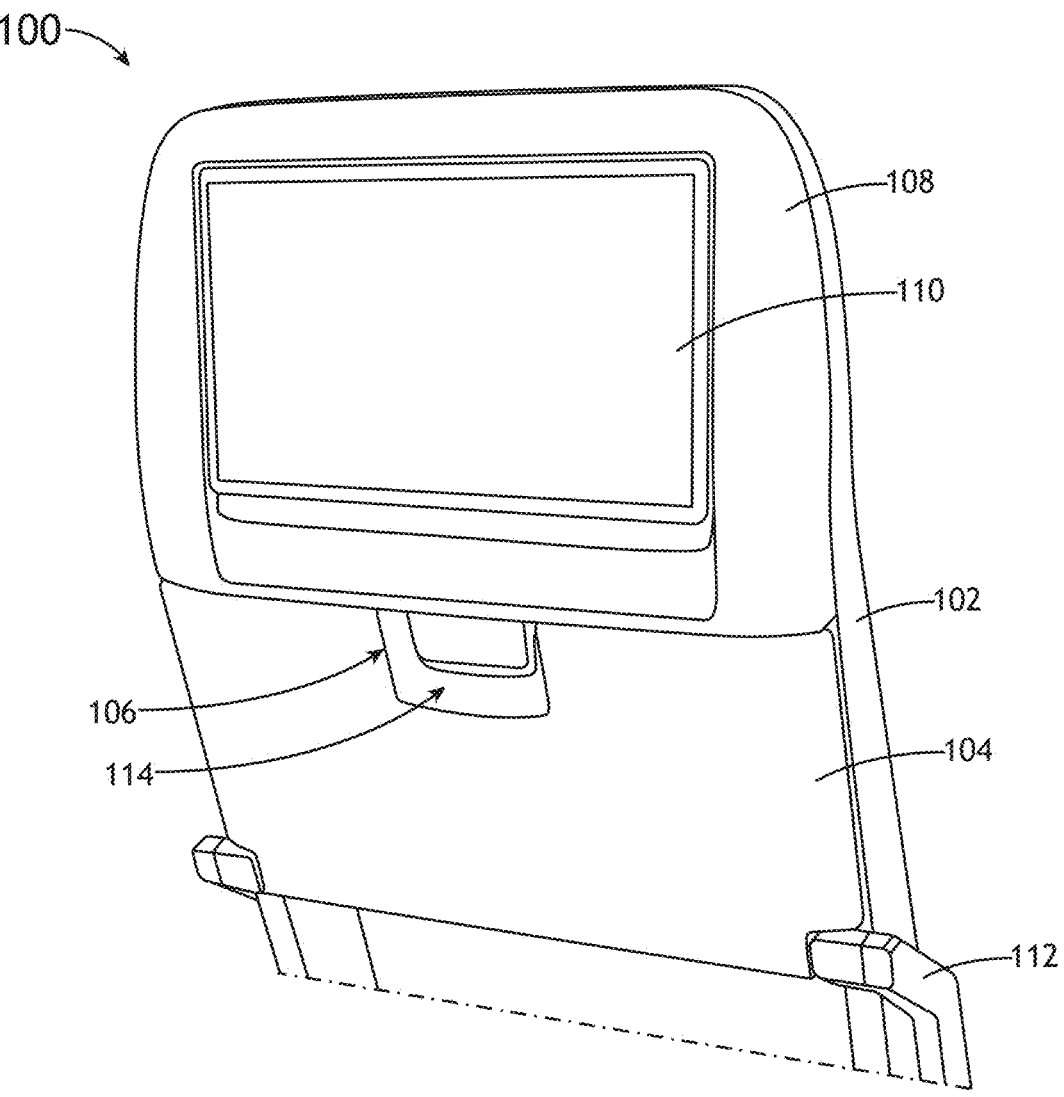
FIG. 1 is a perspective view of a passenger seat assembly including a tray table shown in a stowed position, in accordance with example embodiments of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to an interlock assembly for securing a passenger seat tray table, a tray table assembly for mounting to a passenger seat, and a passenger seat assembly. In use, components of the interlock assembly are configured to interlock to secure a tray table in a stowed position, and disengage to allow the tray table to be moved to a deployed position. When the tray table is deployed, the interlock assembly is presented as open ready to receive the tray table. In embodiments, stowing action of the tray table causes the interlock assembly to interlock automatically. When interlocked, a handle of the interlock assembly can be actuated to open the interlock assembly to allow the tray table to be deployed. In embodiments, the interlock assembly operates by a push-to-close action.

In a particular conceived example, the passenger seat is an economy class aircraft passenger seat including a backrest, and the tray table is mounted for stowing against a back of the backrest and deploys to a position apart from the backrest. In some embodiments, the tray table is substantially upright when stowed and substantially horizontal when deployed. In some embodiments, the tray table may be mounted directly to the backrest. In other embodiments, the tray table my be mounted to support arms further mounted to the seat frame. In an aircraft application, the tray table may be stowed during taxi, takeoff, and landing (TTOL) and deployed for use during flight. The aircraft passenger seat may be a single seat or part of a seat row wherein each tray table serves a passenger seated in the next single seat or seat row. Advantages of the assemblies disclosed herein include, but are not limited to, positive lock of the catch, one-handed operation, auto latching, action to open is opposite direction of head impact criteria (HIC) impact, no to minimal protruding surfaces, and modern styling.

FIG. 1 illustrates an exemplary embodiment of a passenger seat assembly 100 according to the present disclosure. The passenger seat assembly 100 generally includes a backrest 102, a tray table 104, and an interlock assembly 106 for securing the tray table 104. Additional passenger seat components not shown are understood to include a seat pan, seat frame, armrests, etc. In some embodiments, the passenger seat assembly 100 further includes a bezel 108 mounted to the backrest 102, and a video monitor 110 mounted in the bezel 108. In some embodiments, the video monitor 110 is mounted in an upper recess and the tray table 104 stows in a lower recess to provide a smooth and finished look for the backrest aesthetic.

As shown, the tray table 104 is pivotally mounted to a pair of support arms 112 that are further pivotally mountable to the seat frame, for instance to the seat spreaders. In use, when the tray table 104 is released, the tray table 104 pivots relative to the support arms 112, and the support arms 112 pivot relative to the seat frame such that the tray table 104 moves apart from the backrest 102 and toward horizontal. Other tray table mountings are possible including, but limited to, rotationally fixed support arms and direct mounting to the backrest.

The stowed tray table 104 is retained by the interlock assembly 106. FIG. 1 shows the interlock assembly 106 in an interlocked or closed condition. In embodiments, a recess 114 is formed in the bottom of the forward end of the tray table 104 for receiving part of the closed interlock assembly 106 such that the interlock assembly 106 does not protrude from the backrest 102. The recess 114 further creates a space between the bottom of the tray table 104 and the closed interlock assembly 106 for grabbing to open the interlock assembly 106 to release the tray table 104.

Figure 2:
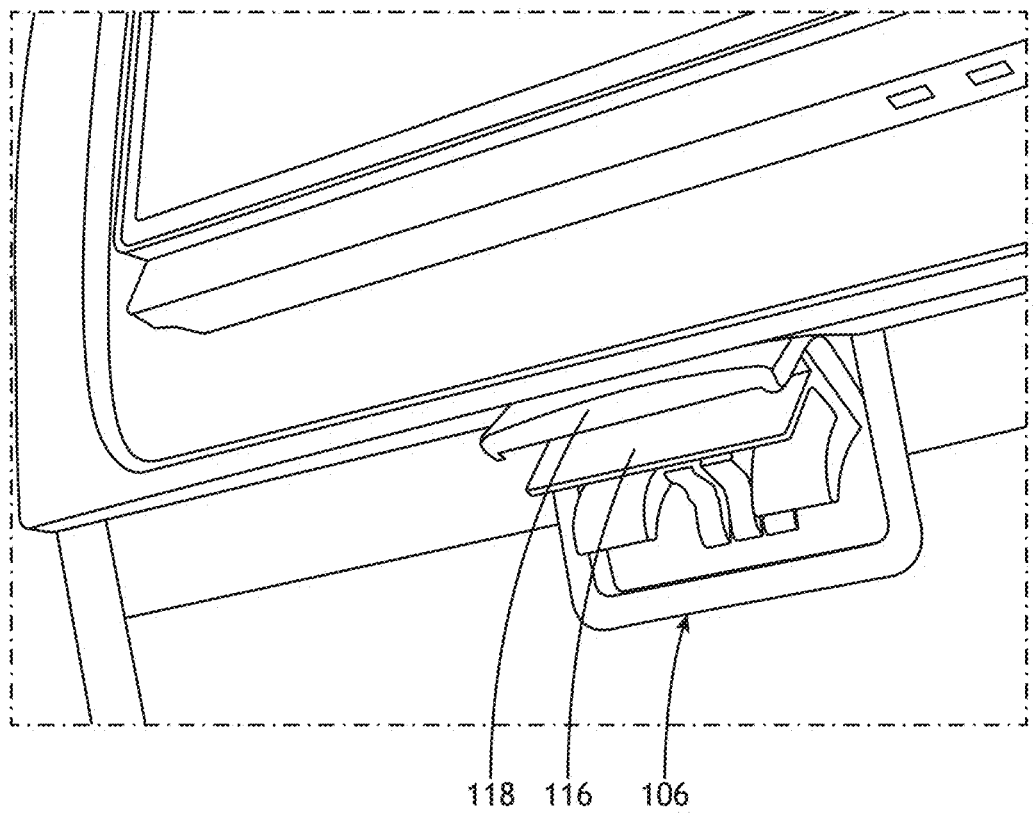
FIG. 2 is a detailed view of FIG. 1 showing an interlock assembly in an open condition when the tray table is deployed, in accordance with example embodiments of this disclosure.

FIG. 2 illustrates the interlock assembly 106 ready and open to receive the tray table for stowing. As discussed in detail below, the interlock assembly 106 includes a catch 116 and a handle 118 configured to interlock to secure the tray table for stowing, and disengage to release the tray table for deploying. When open, the catch 116 is presented and positioned to receive the tray table, and more particularly, receive the 'forward' end of the tray table.

Figure 3:
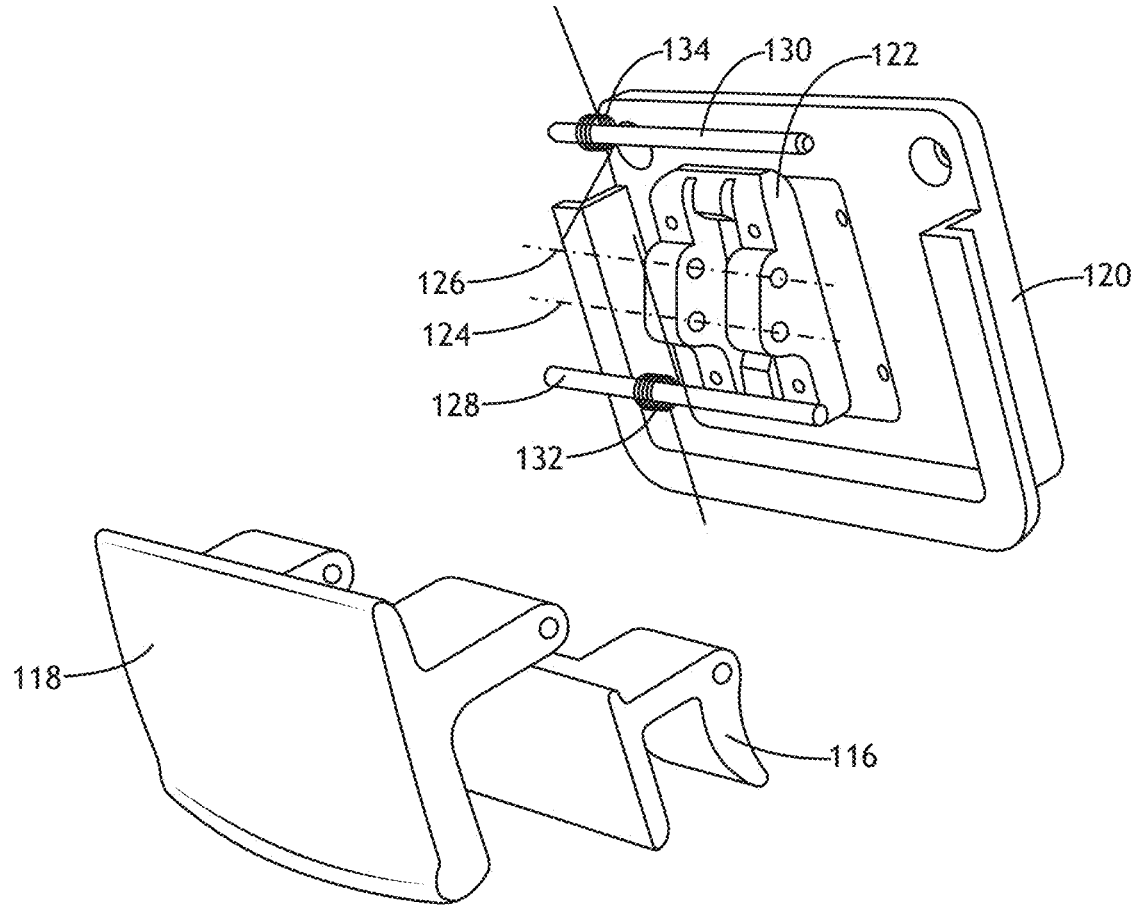
FIG. 3 is an exploded view of the interlock assembly, in accordance with example embodiments of this disclosure.

FIG. 3 illustrates the basic components of the interlock assembly 106. In embodiments, the interlock assembly 106 includes a bezel 120 mountable to the backrest and defining an interior space. A mounting block 122 may mount in the interior space or in some embodiments directly to the backrest. The mounting block 122 defines a first pivot axis 124 and a second pivot axis 126 positioned above the first pivot axis 124. The catch 116 pivotally mounts to the mounting block 122 such that the catch 116 pivots about the first pivot axis 124, and the handle 118 pivotally mounts to the mounting block 122 such that the handle 118 pivots about the second pivot axis 126. The first pivot axis 124 and the second pivot axis 126 are separate and spaced apart such that the catch 116 and the handle 118 pivot about different arcs.

In embodiments, a first pin 128 is used to pivotally mount the catch 126 to the mounting block 122, and a second pin 130 is used to separately pivotally mount the handle 118 to the mounting block 122. A first torsion spring 132, mounted on the first pin 128, interacts between the mounting block 122 and the catch 116 to bias the catch 116 open. A second torsion spring 134, mounted on the second pin 130, interacts between the mounting block 122 and the handle 118 to bias the handle 118 closed. In this configuration, the torsion springs 132, 134 bias their respective components in opposite directions, where the catch 116 is biased 'up' and the handle 118 is biased 'down'. This biasing scheme presents the catch 116 open when the tray table is deployed, and biases the handle 118 into an automatic interlocking condition for when the tray table is stowed.

Figure 4:
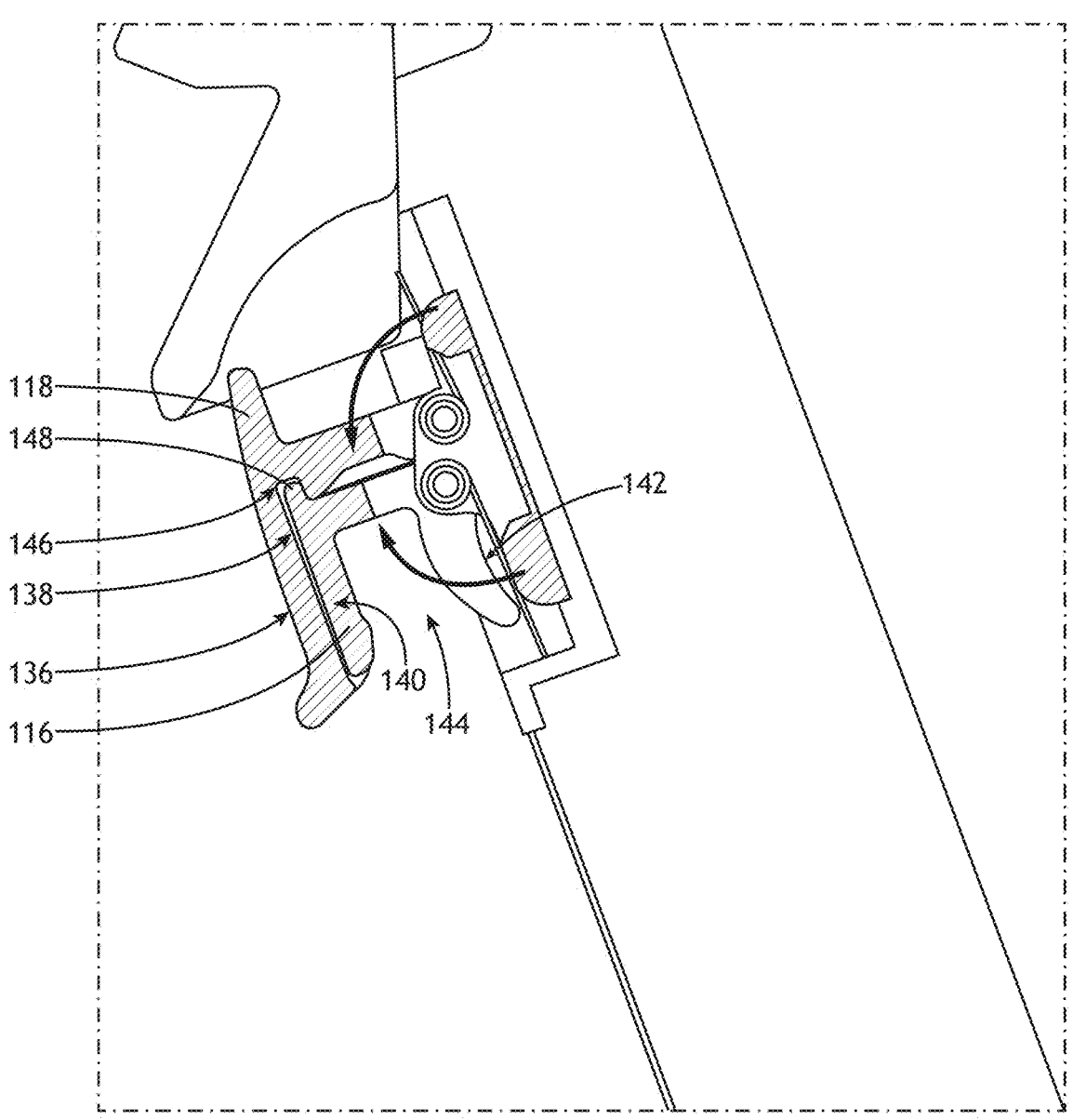
FIG. 4 is a cross-sectional view through the interlock assembly shown open, in accordance with example embodiments of this disclosure.

FIG. 4 illustrates the interlock assembly 106 when each of the catch 116 and the handle 118 are closed to achieve an interlocked condition for securing the tray table (not shown) in the stowed position. In embodiments, the handle 118 has an exterior facing side 136 and an interior facing side 138, and the catch 116 has an exterior facing side 140, an interior facing side 142, and an interior space 144 positioned between the exterior facing side 140 and the interior facing side 142. In use, to secure the tray table, the 'forward' end of the tray table is configured to be 'caught' in the interior space 144 as the tray table is moved to the stowed position. The exterior facing side 140 of the catch 116 is configured to engage with the interior facing side 138 of the handle 118 to interlock the handle 118 and the catch 116.

In some embodiments, the shape of the interior facing side 138 of the handle 118 substantially matches the shape of the exterior facing side 140 of the catch 116 such that the handle 118 and catch 116 securely interlock. In some embodiments, the interior facing side 138 of the handle 118 includes a groove 146, the exterior facing side 140 of the catch 118 includes a notch 148, and the notch 148 is configured to be received in the groove 146 to interlock the handle 118 and the catch 116. By biasing the catch 116 and the handle 118 towards each other, and by shaping the surfaces to engage and interlock, it can be assured that the interlock assembly 106 remains closed to secure the tray table in the stowed position during normal use and also during a crash event.

Figure 5:
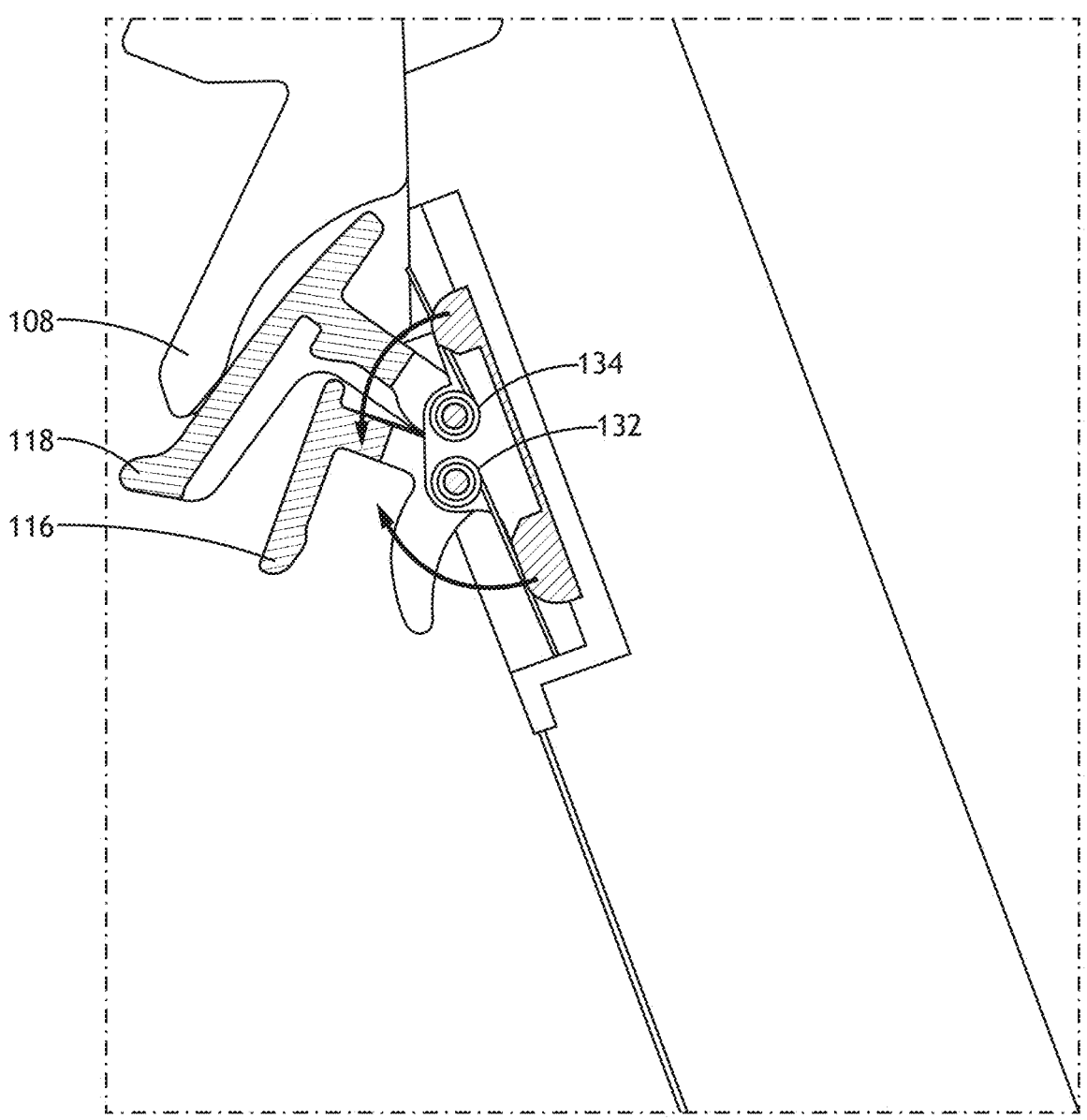
FIG. 5 is a cross-sectional view through the interlock assembly shown closed, in accordance with example embodiments of this disclosure.

FIG. 5 illustrates the interlock assembly 106 when the catch 116 and the handle 118 are disengaged to release the tray table. In some embodiments, the bezel 108 may form a hood for receiving the open handle 118. The open catch 116 is positioned and presented for receiving the stowing tray table, and is held in the open position by the spring force of the first torsion spring 132. At the same time, the handle 118 is biased closed from the spring force of the second torsion spring 134. The corresponding shapes of the catch 116 and the handle 118 and the offset pivot axes prevent the handle 118 from rotating downward into an interlocked condition when the catch 116 is open. When the catch 116 is closed by the action of moving the tray table to the fully stowed position, the handle 118 is able to fall into place over the catch 116 as shown in FIG. 4. Thus, for stowing the tray table, the interlock re-engages automatically providing one-handed stowing action. When the handle 118 is lifted against the force of the second torsion spring 134, the catch is free to pivot open initiate the deploying action of the tray table, which can then be grabbed and rotated downward or use. As mentioned above, the release action of the handle 118 is up, which is opposite to the direction of head strike action. Thus, in the event of a head strike, downward force on the handle 118 will not cause the handle 118 to open.

From the above description, it is clear that the inventive concepts disclosed herein are well adapted to achieve the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. An interlock assembly for securing a passenger seat tray table, comprising:
   a mounting block mountable to a passenger seat;
   a catch pivotally mounted to the mounting block and configured to pivot about a first pivot axis;
   a handle pivotally mounted to the mounting block and configured to pivot about a second pivot axis;
   a first torsion spring biasing the catch open; and
   a second torsion spring biasing the handle closed;
   wherein the handle and the catch are configured to close and interlock to secure the passenger seat tray table, and disengage and open to release the passenger seat tray table.

2. The interlock assembly according to claim 1, wherein:
   the handle has an exterior facing side and an interior facing side;
   the catch has an exterior facing side, an interior facing side, and an interior space positioned between the exterior facing side and the interior facing side;
   the passenger seat tray table is configured to be caught in the interior space to secure the passenger seat tray table; and
   the exterior facing side of the catch is configured to interlock with the interior facing side of the handle.

3. The interlock assembly according to claim 2, wherein a shape of the interior facing side of the handle substantially matches a shape of the exterior facing side of the catch.

4. The interlock assembly according to claim 2, wherein:
   the interior facing side of the handle includes a groove;
   the exterior facing side of the catch includes a notch; and
   the notch is configured to be received in the groove to interlock the handle and the catch.

5. The interlock assembly according to claim 1, wherein, when the handle and the catch are disengaged, the catch is open to receive the passenger seat tray table.

6. The interlock assembly according to claim 1, wherein:
   an action of securing the tray table causes the catch to close and the handle to close automatically to interlock with the catch; and
   an action of opening the handle causes the handle to disengage from the catch to allow the catch to open to release the passenger seat tray table.

7. The interlock assembly according to claim 1, wherein the second pivot axis is positioned above the first pivot axis.

8. A tray table assembly for a passenger seat, comprising:
   a tray table mountable to the passenger seat; and
   an interlock subassembly, comprising:
      a mounting block mountable to the passenger seat;
      a catch pivotally mounted to the mounting block and configured to pivot about a first pivot axis;

a handle pivotally mounted to the mounting block and configured to pivot about a second pivot axis;

a first torsion spring biasing the catch open; and a second torsion spring biasing the handle closed;

wherein the handle and the catch are configured to close and interlock to secure the tray table in a stowed position, and disengage and open to release the tray table for deployment.

9. The tray table assembly according to claim 8, wherein the interlock subassembly is configured to be mounted to the passenger seat above the tray table such that the handle is positioned above the tray table when the tray table is in the stowed position.

10. The tray table assembly according to claim 8, wherein:

the handle has an exterior facing side and an interior facing side;

the catch has an exterior facing side, an interior facing side, and an interior space positioned between the exterior facing side and the interior facing side;

a front of the tray table is configured to be caught in the interior space to secure the tray table; and the exterior facing side of the catch is configured to interlock with the interior facing side of the handle.

11. The tray table assembly according to claim 10, wherein a shape of the interior facing side of the handle substantially matches a shape of the exterior facing side of the catch.

12. The tray table assembly according to claim 10, wherein:

the interior facing side of the handle includes a groove;

the exterior facing side of the catch includes a notch; and the notch is configured to be received in the groove to interlock the handle and the catch.

13. The tray table assembly according to claim 8, wherein, when the handle and the catch are disengaged, the catch is open to receive the tray table.

14. The tray table assembly according to claim 8, wherein:

an action of securing the tray table causes the catch to close and the handle to close automatically to interlock with the catch; and an action of opening the handle causes the handle to disengage from the catch to allow the handle to open the release the tray table.

15. An aircraft passenger seat assembly, comprising:

a passenger seat having a backrest;

a tray table moveable between a stowed position against a back of the backrest and a deployed position apart from the backrest; and an interlock subassembly for securing the tray table in the stowed position, the interlock subassembly comprising:

a mounting block mounted to the back of the backrest and above the tray table;

a catch pivotally mounted to the mounting block and configured to pivot about a first pivot axis;

a handle pivotally mounted to the mounting block and configured to pivot about a second pivot axis;

a first torsion spring biasing the catch open; and a second torsion spring biasing the handle closed;

wherein the handle and the catch are configured to close and interlock to secure the tray table in the stowed position, and disengage and open to release the tray table to allow the tray table to move to the deployed position.

16. The aircraft passenger seat assembly according to claim 15, further comprising a bezel mounted to the back of the backrest, the bezel including a bottom recess for receiving the handle when the handle is open.

17. The aircraft passenger seat assembly according to claim 15, wherein:

the handle has an exterior facing side and an interior facing side;

the catch has an exterior facing side, an interior facing side, and an interior space positioned between the exterior facing side and the interior facing side;

a front of the tray table is configured to be caught in the interior space to secure the tray table; and the exterior facing side of the catch is configured to interlock with the interior facing side of the handle.

18. The aircraft passenger seat assembly according to claim 17, wherein a shape of the interior facing side of the handle substantially matches a shape of the exterior facing side of the catch.

19. The aircraft passenger seat assembly according to claim 17, wherein:

the interior facing side of the handle includes a groove;

the exterior facing side of the catch includes a notch; and the notch is configured to be received in the groove to interlock the handle and the catch.

20. The aircraft passenger seat assembly according to claim 15, wherein:

an action of stowing the tray table causes the catch to close and the handle to close automatically to interlock with the catch; and an action of opening the handle causes the handle to disengage from the catch to allow the handle to open the release the tray table.

* * * * *